(12) United States Patent
Parhar et al.

(10) Patent No.: US 7,838,585 B2
(45) Date of Patent: Nov. 23, 2010

(54) PLASTIC ADHESIVE

(75) Inventors: Amrit Parhar, North Ridgeville, OH (US); Forest Hamptom, III, Elyria, OH (US); Robert J. Duff, Maple Heights, OH (US)

(73) Assignee: Oatey Company, Cleveland, OH (US)

( * ) Notice: Subject to any disclaimer, the term of this patent is extended or adjusted under 35 U.S.C. 154(b) by 244 days.

(21) Appl. No.: 12/171,656

(22) Filed: Jul. 11, 2008

(65) Prior Publication Data

US 2010/0006220 A1    Jan. 14, 2010

(51) Int. Cl.
*C08K 5/07* (2006.01)

(52) U.S. Cl. ...................... 524/356; 524/360
(58) Field of Classification Search .................. 524/356
See application file for complete search history.

(56) References Cited

U.S. PATENT DOCUMENTS

| | | | |
|---|---|---|---|
| 5,073,615 A | 12/1991 | Shen | |
| 5,252,634 A | 10/1993 | Patel et al. | |
| 5,376,717 A | 12/1994 | Patel et al. | |
| 5,416,142 A | 5/1995 | Bush et al. | |
| 5,422,388 A * | 6/1995 | Patel et al. | 524/104 |
| 5,470,894 A | 11/1995 | Patel et al. | |
| 5,495,040 A | 2/1996 | Patel et al. | |
| 6,087,421 A | 7/2000 | Patel et al. | |
| 6,372,821 B1 | 4/2002 | Patel et al. | |
| 2006/0030689 A1 | 2/2006 | Parhar et al. | |
| 2006/0252865 A1 | 11/2006 | Bush et al. | |

* cited by examiner

*Primary Examiner*—Ling-Siu Choi
*Assistant Examiner*—Hui Chin
(74) *Attorney, Agent, or Firm*—Calfee, Halter & Griswold, LLP

(57) ABSTRACT

Macrocyclic compounds, e.g., ketones, crown ethers, methicones etc., have been found to be effective co-solvents in solvent based adhesives for pipe joining applications. Because of their enhanced solubility with VOC exempt solvents (40 C.F.R. 51.100), the calculated VOC content of the adhesive can be lowered to at least 75% of those established by SCAQMD Rule 116A.

17 Claims, No Drawings

PLASTIC ADHESIVE

BACKGROUND AND SUMMARY

Organic solvent based adhesives have been used for many years for joining objects made from PVC (polyvinyl chloride), CPVC (chlorinated polyvinyl chloride), ABS (acrylonitrile-butatdiene-styrene) and other thermoplastics. In use, the organic solvent partially dissolves or at least softens the surfaces to be joined, thereby achieving an intimate bond between these surfaces when the organic solvent evaporates. Normally, a small amount of thermoplastic resin, the same as or similar to the thermoplastic to be joined, is dissolved in the solvent, thereby producing a "solvent cement." Additionally or alternatively, an acrylic resin can be included in the solvent cement, as acrylics adhere well to all three common plastics, i.e., PVC, CPVC and ABS. See, for example, U.S. Pat. No. 5,073,615 and U.S. Pub. App. No. 2006/0252865, the disclosures of which are incorporated herein by reference.

Many different organic solvents have been used for making organic solvent based adhesives. Examples include ketones, ethers, esters, amides, carbonates, organic sulfoxides, organic sulfones, organic sulfides, etc. Mixtures of different solvents are common. See, for example, the following patent documents, the disclosures of which are incorporated by reference: U.S. 2006/0030689, U.S. Pat. No. 6,372,821, U.S. Pat. No. 6,087,421, U.S. Pat. No. 5,495,040, U.S. Pat. No. 5,470.894, U.S. Pat. No. 5,422,388, U.S. Pat. No. 5,416,142, U.S. Pat. No. 5,376,717 and U.S. Pat. No. 5,252,634.

In accordance with this invention, it has been found that the amount of liquid organic solvent needed to produce an effective solvent cement, and hence the VOC content of such cements, can be reduced by including in the composition cyclododecanone ("CDDK") or other oxygen and/or nitrogen-containing macrocyclic compound.

Thus, this invention provides a solvent cement for bonding plastics comprising (a) a corresponding polymer (i.e., a polymer which corresponds to the thermoplastic to be joined) selected from PVC, CPVC and ABS, (b) at least one polar organic solvent, (c) an optional sulfur containing solvent, (d) an optional co-solvent capable of at least partially dissolving or at least swelling the corresponding polymer, (e) an optional additional polymer selected from an acrylic polymer, a vinyl aromatic polymer, a vinyl pyrrolidone polymer, and mixtures thereof, and (f) at least one oxygen and/or nitrogen-containing macrocyclic compound.

In addition, this invention also provides a process for bonding PVC, CPVC or ABS plastic pipe and other molded articles to one another, the process comprising applying a solvent cement to the surfaces to be bonded and then bringing these surfaces into contact with one another, wherein the solvent cement comprises (a) a corresponding polymer selected from PVC, CPVC and ABS, (b) at least one polar organic solvent, (c) an optional sulfur containing solvent, (d) an optional co-solvent capable of at least partially dissolving or at least swelling the corresponding polymer, (e) an optional additional polymer selected from an acrylic polymer, a vinyl aromatic polymer, a vinyl pyrrolidone polymer, and mixtures thereof, and (f) at least one oxygen and/or nitrogen-containing macrocyclic compound.

DETAILED DESCRIPTION

In accordance with this invention, the amount of liquid organic solvent needed to prepare an effective solvent cement is reduced by including at least one oxygen and/or nitrogen-containing macrocyclic compound in the composition.

Polar Organic Solvent

The solvent cements of this invention normally contains at least one liquid polar organic solvent such as a ketone, ether, ester, amide, carbonate, or a mixture thereof. In one embodiment, the liquid polar organic solvent comprises a mixture of at least one ketone and tetrahydrofuran. In another embodiment, the inventive solvent cement is free of tetrahydrofuran. The amount of polar organic solvent contained in the inventive solvent cement can vary over a wide range. In one embodiment, the amount of liquid polar organic solvent is from about 10%, 20%, 30% or 50% up to about 60%, 70%, 80%, 85% or even 90% by weight of the adhesive composition.

The ketones which can be used as liquid polar organic solvents in the inventive solvent cement include linear aliphatic ketones, cyclic aliphatic ketones, aromatic ketones, mixed aliphatic/aromatic ketones, diketones, etc. Specific examples of useful ketones include acetone, methyl ethyl ketone (MEK), methylpropyl ketone (MPK), ethyl propyl ketone (EPK), methyl butyl ketone (MBK), methylisobutyl ketone (MIBK), heptanones, isophorone, acetyl acetone (ACAC), acetyl acetonate, cyclopentanone (CYP), cyclohexanone (CYH), cycloheptanone, 2-t-butyl cyclohexanone, 4-t-butyl cyclohexanone, 2-isopropyl-4 methyl cyclohexanone, acetophenone (ACPH), other <$C_{10}$ ketones, etc. Examples of useful mixtures of ketones include a mixture of methyl ethyl ketone and cyclohexanone, mixtures of methyl ethyl ketone and acetone, mixtures of acetone and acetophenone, and mixtures of methyl ethyl ketone, acetone and cyclopentanone.

The ethers that can be used as the liquid polar organic solvents in the inventive solvent cements include linear aliphatic ethers, cyclic aliphatic ethers, aromatic ethers. The cyclic ethers include mixed ketoethers. Specific examples of useful ethers include dimethoxy ethane, dimethyoxy propyl glycol, diethyl ether, tetrahydrofuran (THF), substituted tetrahydrofuran in which one or more hydrogens is replaced with $C_{1-10}$ alkyl, tetrahydropyran 1,3-dioxane, 1,4-dioxane, 1,3 dioxolane, tetramethyl tetrahydrofuran, 2,3 dihydrobenzofuran, tetrahydro 4-H-pyran-4-one, tetrahydrothio pryran-4-one, methyl cellosolve, thioxane, etc.

The esters that can be used as the liquid polar organic solvents in the inventive solvent cements include linear esters as well as cyclic esters. Examples include methylacetate, ethyl acetate, propyl acetate, ethyl formate, ethyl propionate, butyl acetate, propylene glycol methyl ether acetate, 2-butyoxy ethylacetate, ethyl lactate, dimethyl succinate, butyrolactone, etc.

The amides that can be used as the liquid polar organic solvents in the inventive solvent cements include linear and cyclic amides such as N,N-2-trimethyl propionamide, dimethyl formamide (DMF), tetramethyl urea, pyrrolidone, N-methylpyrrolidone, etc.

The carbonates that can be used as the liquid polar organic solvents in the inventive solvent cement include ethylene carbonate, propylene carbonate, etc.

As well appreciated by those skilled in the art, the choice of liquid solvent to use in a particular solvent cement (both in connection with the polar organic solvents described here as well as the sulfur containing solvents and the co-solvents discussed below) depends on many factors including the type and amount of polymer resins to be dissolved in the solvent, the thermoplastics to be bonded with the adhesive, the desired viscosity of the adhesive, etc. Additional factors such as toxicity effects and biodegradability may also play a role. Those skilled in the art are well aware of these factors and can easily choose an appropriate solvent, or combination of solvents, for particular applications by routine experimentation.

Sulfur Containing Organic Solvents

In another embodiment, the inventive solvent cements can also include a sulfur containing liquid organic solvent such as the organic sulfoxides, organic sulfones and organic sulfides described in commonly assigned U.S. Published Application 2006/0030689 A1. Thus, the inventive adhesives can include an organic sulfoxide characterized by the formula $R_2SO$ (I), a sulfone characterized by the formula $R_2SO_2$ (II), a sulfide characterized by the formula $R_2S$ (III) or mixtures of two or more of these compounds. Each R group in formula I and formula 11 is independently an alkyl or an aryl group. In one embodiment, the alkyl group will contain from 1 to 5 carbon atoms and may be exemplified by methyl, ethyl, propyl, isopropyl, n-butyl, n-amyl, etc. The aryl group includes substituted aryls such as alkaryl and may contain from 6 to 8 carbon atoms. Examples include phenyl, methylphenyl, etc. In one embodiment, the two R groups in the sulfoxide, sulfone, or sulfoxide are both alkyl groups or aryl groups, and in another embodiment, one R group may be alkyl and the second R group may be an aryl group.

Useful sulfoxides include aliphatic sulfoxides, aromatic sulfoxides and cyclic sulfoxides. Specific examples of organic sulfoxides which may be utilized in the adhesive compositions of the present invention include dimethyl sulfoxide, diethyl sulfoxide, dipropyl sulfoxide, di-n-butyl sulfoxide, ethylmethyl sulfoxide, diphenyl sulfoxide, tetramethylene sulfoxide, etc. Examples of aliphatic, aromatic and cyclic organic sulfones useful in the invention include dimethyl sulfone, diethyl sulfone, dipropyl sulfone, di-n-butyl sulfone, ethyl methylsulfone, diphenyl sulfone, tetramethylene sulfone (sulfolane) 2-4-dimethylsulfolane. Useful sulfides include linear, cyclic and aromatic sulfides. Examples of the organic sulfides include dimethyl sulfide, diethyl sulfide, dipropyl sulfide, di-n-dibutyl sulfide, di-sec-butyl sulfide, di-amyl sulfide, ethylmethylsulfide, diphenyl sulfide, tetramethylene sulfide, etc. In general, compounds of the following formula can be used:

$$R_2SO_x$$

where each R is independently selected from an aliphatic, aromatic or alkyl aromatic radical having 1-12 carbon atoms.

As in the case of the organic solvent based adhesives of commonly assigned U.S. Published Application 2006/0030689 A1, the inventive solvent cements can also be free or essentially free of alkyl substituted benzenes and alkyl substituted naphthalenes. Solvent cements which are free or essentially free of aromatic compounds, in general, are also contemplated.

Co-Solvents

In addition to the polar organic solvents and sulfur containing solvents described above, other organic solvents which are capable of at least partially dissolving or at least swelling the thermoplastic resin to be bonded can also be included in the inventive solvent cements. For example, non-polar, volatile solvents capable of vaporizing under a wide variety of different application temperatures (e.g., ambient temperatures or slightly above ambient temperatures) can be used. Examples include halogenated solvents such as methylene chloride, ethylene dichloride, and trichloroethylene, chlorobenzene, OXSOL 100 (parachlorobenzotrifluoride), and the like; as well as various aromatic compounds such as toluene, xylene, and the like.

Corresponding Polymers

The inventive solvent cements also contain one or more thermoplastic polymers generally corresponding to the type or types of plastics to be bonded together. In other words, the thermoplastic resin included in the inventive adhesive for bonding a particular object is chemically similar to the thermoplastic resin from which the object is made. So, for example, an adhesive intended for use in bonding polyvinyl chloride (PVC) objects together would contain dissolved PVC. In the same way, adhesives intended for bonding objects made from chlorinated polyvinyl chloride (CPVC) or acrylonitrile butadiene-styrene polymer (ABS), for example, would contain dissolved CPVC or ABS, respectively. Such adhesive compositions are commonly known as "solvent cements," and for convenience these dissolved resins will be referred to in this disclosure as "corresponding polymers" or "corresponding resins." In addition, "polymer" in the context of this disclosure will be understood to include homopolymers, copolymers, terpolymers, etc., while "PVC," "CPVC," and similar designations will be understood as including copolymers, terpolymers, etc. containing other comonomers.

ABS polymers that can be used as corresponding resins in the inventive adhesives generally contain at least 6 wt % butadiene, at least about 15 wt % acrylonitrile, and at least about 15 wt. % styrene, substituted styrene or both. In one embodiment, useful ABS resins contain from about 25-45 wt % acrylonitrile, 6-15 wt % butadiene and 40-60 wt % styrene or substituted styrene.

Vinyl chloride polymers that can be used as corresponding resins in the inventive adhesives can be any vinyl chloride polymer or copolymer. Vinyl chloride polymers and copolymers are well known in the art. Copolymers of vinyl chloride include, for example, copolymers of vinyl chloride with one or more copolymerizable monomers having at least one terminal $CH_2$=C<group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, or up to 20% of the copolymerizable monomers. The inherent viscosity of the PVC polymers and copolymers may range from about 0.30 to 1.5, or from about 0.30 to 0.95. The inherent viscosity (IV) of the water insoluble polymer affects the viscosity and the viscosity stability of the adhesive compositions.

Chlorinated polyvinyl chloride polymers (CPVC) that can be used as the corresponding resins in the inventive adhesives include chlorinated polyvinyl chloride (also referred to sometimes as post-chlorinated PVC) homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57% to about 75% by weight of chlorine. CPVC is often the resin of choice where its high heat deflection resistance is desirable such as in hot water piping systems.

The amount of corresponding resin included in the inventive solvent cements depends in part on the particular corresponding resin used and the intended use of the adhesive. So, for example, the inventive adhesive can contain about 1 to 60 wt. % corresponding resin. Adhesives containing about 1-30 wt. %, or even about 10-15 wt. %, corresponding resin are especially interesting. Generally speaking, solvent cements made in accordance with this invention will contain at least 5 wt % of the corresponding resin.

As well appreciated by those skilled in the art, the properties of a solvent cement depend on many factors including the identity and amount of solvents, the monomers, comonomers and molecular weight of the dissolved corresponding resin, the monomers, comonomers and molecular weight of any additional resin included in the cement as further discussed below, etc. Those skilled in the art are well aware of these factors and can easily choose an appropriate concentration for the corresponding resin (as well as an appropriate concentration for any additional resin that may also be present, as further discussed below) by routine experimentation in view of the desired properties of the solvent cement to be produced, including the thermoplastics to be bonded with the adhesive, the desired viscosity of the adhesive, etc.

Additional Resin

In still another embodiment of the invention, the solvent cements described above can include another thermoplastic polymer in addition to the corresponding resins described above. For convenience, such additional thermoplastic polymers are referred to in this disclosure as "additional resins." Examples include acrylic resins, vinyl aromatic polymers, vinyl pyrrolidone polymers, and mixture thereof.

Suitable acrylic resins for this purpose are those described in U.S. Pat. No. 5,416,142 to Bush et al., the disclosure of which is also incorporated herein by reference. In general, they comprise polymers and copolymers of acrylic esters represented by the general formula $CH_2=C(R^1)C(OO)R^5$, wherein $R^1$ is hydrogen or a lower alkyl group containing from 1 to about 6 carbon atoms, and $R^5$ is a lower alkyl group containing from 1 to about 16 or more carbon atoms. More often, $R^1$ is hydrogen or a methyl or ethyl group and $R^5$ is an alkyl group containing from 1 to about 4 carbon atoms. Examples of such acrylic esters include: methyl acrylate, ethyl acrylate, propyl acrylate, isopropyl acrylate, n-butyl acrylate, sec-butyl acrylate, isobutyl acrylate, hexyl acrylate, heptyl acrylate, 2-heptyl acrylate, 2-ethyl hexyl acrylate, dodecyl acrylate, hexadecyl acrylate, methyl methacrylate, methyl ethacrylate, ethyl methacrylate, ethyl ethacrylate, etc.

Suitable comonomers for including in such acrylic ester copolymers include acrylic acid, methacrylic acid, acrylamide, methacrylamide, acrylonitrile, maleimide and N-substituted maleimides such as N-alkylmaleimide, N-cycloalkylmaleimide and N-arylmaleimide, and styrene. Normally, such acrylic ester copolymers will include at least about 50 mol. % acrylic and/or methacrylic ester monomers, more typically at least about 60, 70, 80 or even 90 mol. % acrylic and/or methacrylic ester monomers. Polymers containing at least about 50 mol. % methyl methacrylate, more typically at least about 60, 70, 80, 90 or even 100 mol. % methyl methacrylate, are especially interesting.

In one embodiment, these acrylic ester copolymers are prepared by the polymerization (generally free radical) of alkyl methacrylate with maleimide or substituted maleimides. These copolymers can be prepared having a wide range of molecular weights and with a wide range of acrylate group monomers and a wide range of maleimide group monomers. Generally, these imide-containing copolymers will contain 70% or more of the acrylate monomer fraction and up to about 30% by weight of the maleimide monomer fraction. More often the copolymers contain from about 90% to about 99% by weight of the acrylate monomer fraction and from about 1% to about 10% by weight of the imide monomer fraction. Inide-containing acrylic copolymers such as described above are more fully described in U.S. Pat. No. 5,073,615 which is hereby incorporated by reference.

The molecular weights of the acrylic ester polymers that can be used as the additional resins in the inventive adhesive can vary widely, and essentially any molecular weight can be used. As further discussed below, the viscosity exhibited by a particular solvent cement depends on many factors, including molecular weight of the acrylic ester polymer. Thus, the molecular weight chosen for a particular embodiment should be selected in keeping with the desired viscosity of the intended product, as discussed above. Against this background, the weight average molecular weight of the acrylic ester polymer may be as low as 20,000 and as high as 6,000,000. Molecular weights on the order of 34,000 to 4,000,000, and even 400,000 to 3,000,000, are more typical.

The vinyl aromatic polymers that can be used as the additional resins in the inventive adhesive include homopolymers, copolymers, terpolymers and graft copolymers. These copolymers include polymers of a vinyl aromatic compound and one or more copolymerizable monomers such as unsaturated dicarboxylic acid compounds including the acids, anhydrides, imides, metal salts and partial esters of said acids; acrylic acids and esters; alkyl-substituted acrylic acids and esters; acrylonitriles; dienes such as butadiene; etc. The terpolymers include polymers of the vinyl aromatic compound with two or more monomers including dienes, acrylonitrile, acrylic acids and esters, etc. See, the above-noted U.S. Pat. No. 5,416,142 for a fuller description of the vinyl aromatic polymers that can be used as the corresponding resin in the inventive adhesives.

The vinyl pyrrolidone polymers that can be used as the additional resins in the inventive adhesive include homopolymers, copolymers, terpolymers and graft polymers. Copolymers include polymers of the vinyl pyrrolidone and one or more copolymerizable monomers such as acrylic acids or esters, vinyl esters, etc. The vinyl pyrrolidone monomer generally is an N-vinyl or 1-vinyl, 2-pyrrolidone monomer. The pyrrolidone ring may contain one or more substituents such as lower alkyl groups. In one embodiment, copolymers of N-vinyl-2-pyrrolidone with an acrylic or vinyl ester preferred. Copolymerizable acrylic esters include methyl acrylate, ethyl acrylate, methylmethacrylate, etc. Copolymerizable vinyl esters include vinyl acetate, vinyl propionate, etc. A preferred vinyl ester is vinyl acetate. A fuller description of these polymers and copolymers can also be found in the above-noted U.S. Pat. No. 5,416,142.

As indicated above, the viscosities of solvent cements produced according to this invention depend, among other things, on the concentration of the additional resins in the composition. Hence, the concentration chosen for particular embodiment should also be selected in keeping with the desired viscosity of the intended product. Within this context, concentrations of additional resins as little as about 3 wt. % can be used, although minimum additional resin concentrations of at least about 5, 10, 15, 20, 30 or even 40 wt. % are also contemplated. Similarly, additional resin concentrations as high as about 60 wt. % can also be used, although maximum additional resin concentration of no more than about 50, 40, 30 or even 25 wt. % are also contemplated. Additional resin concentrations on the order of 5 to 20 wt. %, or even 7 to 15 wt. %, are typical.

Macrocyclic Compound

In accordance with this invention, cyclododecanone ("CDDK") or analogous oxygen and/or nitrogen-containing macrocyclic compound is included in the solvent cements formulated in the manner described above. As a result, the concentration of other liquid organic solvents needed to make an effective solvent cement can be reduced significantly. This, in turn, allows solvent cements with lower VOC contents to be produced.

CDDK is a white semi-crystalline solid at room temperature. Therefore, it is surprising that this ingredient effectively serves as a liquid polar solvent when included in the inventive solvent cements. In any event, it has been found that the amount of liquid polar and other solvents that need to be included in a composition to produce an effective solvent cement can be significantly reduced by replacing a portion of these solvents with CDDK or analog. Depending on the particular solvent package used, this modification can result in a significant reduction in the VOC content of the solvent cement product ultimately obtained.

In addition to CDDK, other analogous oxygen and/or nitrogen-containing macrocyclic compounds can be used. In this context, "macrocyclic compound" will be understood to mean a non-polymeric organic compound (including silicones) containing at least an eight member ring. "Non-polymeric" in this context means that they normally have molecular weights below about 1,000. These rings may be either monocyclic, as in CDDK, or bicyclic as in norcamphor, for example. In addition, the oxygen and/or nitrogen atoms in these compounds may be included in, or pendant from, the ring. Typical examples of such compounds include ketones, crown ethers, esters, silicones and amides.

Specific examples of ketones which are useful as the oxygen and/or nitrogen-containing macrocyclic compound of this invention include CDDK, cyclodecanone, cycloundecanone, cyclopentadecanone, norcamphor, cyclotridecanone and 2-adamantanone.

Specific examples of crown ethers which are useful as the oxygen and/or nitrogen-containing macrocyclic compound of this invention include 12-crown-4, 15-crown-5, 18-crown-6, dibenzo-18-crown-6, 4,10-diaza-15-crown-5, dicyclohexano-18-crown-6 and 21-crown-7.

Specific examples of esters which are useful as the oxygen and/or nitrogen-containing macrocyclic compound of this invention include cyclopentadecanolide, oxacyclododecanone, oxacyclododecan-2-one and 16-hexadecanolide.

Specific examples of silicones which are useful as the oxygen and/or nitrogen-containing macrocyclic compound of this invention include D4-methicone and D-5 methicone.

Specific examples of amides which are useful as the oxygen and/or nitrogen-containing macrocyclic compound of this invention include 2-azacyclodecanone and laurelactam.

The amount of CDDK and/or analog included in the inventive solvent cements should be enough to allow the amount of liquid solvent included in these compositions to be reduced while still providing a composition exhibiting the necessary combination of properties needed for an effective solvent cement. In this connection, solvent cements are typically formulated with viscosities low enough to allow the composition to be easily spread on the surfaces to be bonded, with solvency powers for the plastics to be bonded which are high enough to achieve cement bonds with sufficient bond strength, and with solvent packages sufficiently volatile and/or mobile so that an effective cement bond can be formed within a few minutes, preferably within one minute, of application. In general, this means the inventive solvent cements can contain from as little as 1 wt. % CDDK and/or analog, based on the weight of the composition as a whole, to as much as about 60 wt % CDDK and/or analog. Concentrations on the order of 5-50 wt. %, 7-25 wt. %, or even 8-15 wt. % are more typical.

Thus, the concentrations of ingredients in the inventive adhesive can be viewed as generally corresponding to the following:

TABLE 1

Concentrations of Ingredients, Wt. %

| | CDDK or analog | Polar Organic Solvent | Sulfur Containing Solvent | Co-Solvent | Corresponding Resin | Additional Resin |
|---|---|---|---|---|---|---|
| Operable | 1-60% | 70-99% | 0-30% | 0-30% | >0-60% | 0-10% |
| More Common | 1-60% | 40-96% | 0-20% | 0-20% | 3-60% | 0-10% |
| Typical | 5-25% | 45-90% | 0-15% | 0-10% | 5-20% | 0-7% |
| More Typical | 8-15% | 50-83% | 0-15% | 0-10% | 9-12% | 0-5% |

Moreover, while the inventive solvent cement can contain a variety of different solvents, as indicated above, most commonly it will contain MEK (methyl ethyl ketone), ACE (acetone) and/or DMSO (dimethyl sulfoxide). If so, the concentrations of these ingredients can generally be viewed as corresponding to the following:

TABLE 2

Permissible Concentrations of Ingredients, Wt. %

| | CDDK or analog | DMSO | MEK | ACE | Corresponding Resin | Additional Resin |
|---|---|---|---|---|---|---|
| Operable | 1-60% | 0-30% | 0-50%* | 0-50%* | 3-60% | 0-10% |
| Typical | 5-25% | 0-30% | 20-50% | 20-40% | 5-20% | 0-7% |
| More Typical | 8-15% | 0-12% | 35-45% | 25-35% | 9-12% | 0-5% |

*(MEK + ACE) ≧ 40%

Compositions of this type containing 9-12% DMSO are especially interesting.

Other Ingredients

The inventive solvent cements can also contain from 0 to about 4% or even up to 5% by weight of at least one solid particulate inorganic filler. More typically, they will contain about 0.1% or 0.75% by weight up to about 1.5% or 3% or 4% by weight of the solid particulate inorganic filler. The particulate inorganic fillers are inert and are generally included in the solvent cements disclosed here to improve working viscosity and structural strength, and to reduce costs.

The solid particulate inorganic fillers incorporated into the inventive solvent cements preferably are fine powders having an average particle size of less than about 50 microns and a density of less than about 4 g/cc. These inorganic fillers include amorphous silica, silica flour, ground quartz, talc, magnesium silicate, calcium carbonate, clay, whiting, shell flour, wood flour, alumina, antimony trioxide, asbestos powder, barium sulfate, calcined clays, China clays, magnesium oxide, mica powder, fumed silica, etc. A preferred filler is fumed silica available commercially from Wacker Silicones under the trade designation HDK N20 and from the Evonik Degussa Corporation under the trade designation Aerosil.

If desired, other components may be advantageously included in the inventive solvent cements although they are generally free of hollow microspheres. Other components can include lubricants, stabilizers, plasticizers, colorants, pigments, thickeners such as castor oil, thixotropic agents, polymeric rheology additives and processing aids, etc. Small amounts of pigments or colorants such as titanium dioxide, carbon black or a dye or other colorant may be added to the inventive organic solvent based adhesives to serve as a guide for uniform mixing and to provide a method of identifying various adhesive compositions. Exemplary stabilizing agents for PVC and CPVC formulations include alkyltin compounds such as octyl tin maleate, methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); butylthiostannoic acid; etc. Di-lower alkyl tin stabilizers such as $C_4$ to $C_8$ alkyltin mercaptides are normally preferred. The stabilizers are generally present in amounts of from about 0.05 to 3% by weight. Triphenyl phosphite, BHT (butylated hydroxy toluene), complex calcium and zinc soaps of alkyl carboxylic acids and hydrotalcite can also be used.

Still other ingredients that can be included in the inventive solvent cements are polar organic compounds which are normally solid at room temperatures, but nonetheless act as liquid solvents when combined with one or more of the other liquid polar solvents described above. 1,2-butylene carbonate is an example of such a compound.

The inventive solvent cements are easy to apply, cost effective, and cure within a reasonable period of time without the use of heat, pressure, UV light or extraordinary mechanical devices. The bonding or adhesive properties are satisfactory for the intended uses whether non pressure drain, waste, vent (DWV), applications or pressure systems used in potable water applications.

Viscosity

The inventive solvent cements should be thoroughly blended to provide substantially homogeneous mixtures. Substantially homogeneous mixtures are desirable since non-uniform mixtures will result in non-uniform distribution of the adhesive composition and non-uniform adhesion to substrate surfaces.

The inventive solvent cements will normally have viscosities on the order of about 1 to 50,000 cps. "Regular" solvent cements of this invention normally have viscosities on the order of 1-500 cps, more commonly 90 to 200 cps. Similarly, "Medium Duty" solvent cements of this invention normally have viscosities on the order of 500-2,000 cps, more commonly 800 to 1500 cps., while "heavy duty" solvent cements of this invention normally have viscosities on the order of 1,600 to 4,000 cps, more commonly 1,600 to 2,500 cps.

As indicated above, the viscosity exhibited by a particular inventive solvent cement depends on many factors including the concentration and molecular weight of the dissolved resin, if any. Additional factors affecting viscosity include the concentrations and molecular weights of other dissolved resins, the types and amounts of fillers, desired shelf stability, types and amounts of solvents, etc. Those skilled in this field can readily determine the concentration and molecular weights of the acrylic resin and other ingredients in the solvent cements disclosed here to achieve a desired viscosity.

EXAMPLES

In order to more thoroughly describe the invention, the following working examples are provided. In these examples, a variety of different solvent cements were produced, some containing cyclododecanone according to this invention and some not, and then the lap shear strength of the bond created when the cement was used to bond PVC to PVC was determined four weeks after the bond was made according to ASTM D-2564. The compositions of the various solvent cements tested, as well as the lap shear strengths obtained, are set forth in the following Table 3:

TABLE 3

| | Solvent Cement Compositions | | | | | | |
|---|---|---|---|---|---|---|---|
| Ex | CDDK | DMSO | MEK | ACE | PVC | Other | Lap Shear Strength |
| 1 | 30 | | | 30 | 10 | 30% dioctyl terephthalate | |
| A | | 30 | 40 | | 10 | 20% dioctyl terephthalate | 2070 |
| 2 | 45 | | | | 10 | 45% propylene carbonate | |
| 3 | 45 | | | | 10 | 45% methyl acetate | |
| 4 | 20 | 10 | 20 | 40 | 12 | | 1610 |
| 5 | 20 | 20 | | 48 | 12 | | |
| 6 | 30 | | 29 | 29 | 12 | | 847 |
| 7 | 20 | | 34 | 34 | 12 | | 764 |
| 8 | 45 | | | 45 | 10 | | 1248 |

TABLE 3-continued

Solvent Cement Compositions

| Ex | CDDK | DMSO | MEK | ACE | PVC | Other | Lap Shear Strength |
|---|---|---|---|---|---|---|---|
| 9 | 30 | | | 60 | 10 | | |
| 10 | 45 | | 45 | | 10 | | |
| 11 | 20 | 20 | 20 | 30 | 10 | | 1744 |
| 12 | 15 | | | 60 | 10 | 15% cyclododecanediol | |
| 13 | 20 | 20 | | 50 | 10 | | 1637 |
| 14 | 10 | 20 | | 60 | 10 | | |
| 15 | 13 | 17 | 30 | 30 | 10 | | 1122 |
| 16 | 20 | 30 | 20 | 20 | 10 | | 1795[1] |
| 17 | 20 | 30 | | 40 | 10 | | 1670[1] |
| B | | | | 60 | 10 | 30% cyclohexanone | 1120 |
| 18 | 30 | | | | 10 | 60% ethyl lactate[2] | |
| 19 | 45 | | | | 10 | 45% isopropyl alcohol[2] | |
| 20 | 45 | | | 45 | | 10% CPVC resin | |
| C | | | | 45 | 10 | 45% 18-crown-6 | |
| 21 | 20 | 20 | | 50 | | 10% CPVC resin | 2290 |
| D | | | | 45 | 10 | 45% cyclooctanone | 1206 |
| E | | | | 45 | 10 | 45% cycloheptanone | 1464 |
| F | | | | 45 | 10 | 45% cyclopentadecanolide | 584 |
| G | | 25 | 70 | | 10 | 5% cyclododecanol | |
| 22 | 20 | 22 | | 50 | 10 | 10% CPVC resin[3] | |
| H | | | | 45 | 10 | 45% 12-crown-4[4] | |
| I | | 20 | | 50 | 10 | 20% cycloheptanone | 1791 |
| J | | 20 | | 60 | 10 | 10% t-butyl acetate | 942 |
| K | | 20 | | 50 | 10 | 20% cyclohexanone | 1406 |
| 23 | 18 | 20 | | 50 | 10 | 2% fumed silica[5] | |
| 24 | 30 | | 30 | 30 | 10 | | 1804 |
| 25 | 20 | 20 | | 50 | 10 | | 2130 |
| 26 | 20 | 20 | 50 | | 10 | | 2190 |
| 27 | 18 | 10 | 30 | 30 | 12 | | 2030 |
| 28 | 18 | 20 | 25 | 25 | 12 | | |
| 29 | 5 | 5 | 40 | 40 | 10 | | 2109 |
| 30 | 10 | 10 | 35 | 35 | 10 | | 1989 |
| 31 | 20 | | 35 | 35 | 10 | | 1856 |
| 32 | 20 | | 30 | 30 | 10 | 10% cyclomethicone | |
| 33 | 15 | 15 | 30 | 30 | 10 | | |
| 34 | 15 | 15 | | 30 | 10 | 30% t-butyl acetate | 1031 |
| 35 | 5 | 30 | | 25 | 10 | 30% t-butyl acetate | 1262 |
| 36 | 15 | 15 | 30 | 30 | 10 | | |
| 37 | 9 | 11 | 30 | 20 | 10 | 20% t-butyl acetate | |
| 38 | 10 | 10 | 38 | 30 | 12 | | |
| 39 | 10 | 10 | 40 | 30 | 10 | | |
| 40 | 10 | 10 | 39 | 30 | 11 | | |
| 41 | 12.5 | 12.5 | 35 | 30 | 10 | | |
| L | | 30 | 36.5 | 23 | 10 | 0.5% octyl tin maleate | 1711 |
| 42 | 30 | 9.5 | | 50 | 10 | 0.5% octyl tin maleate | 1945 |
| 43 | 30 | | 50 | 9.5 | 10 | 0.5% octyl tin maleate | 1526 |
| 44 | 30 | 30 | | 29.5 | 10 | 0.5% octyl tin maleate | 2047 |
| 45 | 3.3 | 6.7 | 50 | 29.5 | 10 | 0.5% octyl tin maleate | 1837 |
| M | | 10 | 29.5 | 50 | 10 | 0.5% octyl tin maleate | 1387 |
| N | | 23.3 | 50 | 16.2 | 10 | 0.5% octyl tin maleate | 2030 |
| 46 | 23.2 | 16.3 | 50 | | 10 | 0.5% octyl tin maleate | 2010 |
| 47 | 15.6 | 15.6 | 29.1 | 29.1 | 10 | 0.5% octyl tin maleate | 1976 |
| 48 | 10.84 | 29.5 | 49.3 | | 10 | 0.5% octyl tin maleate | 2210 |
| 49 | 30 | 13.2 | 23.2 | 23.2 | 10 | 0.5% octyl tin maleate | 1738 |
| 50 | 10.54 | 29.65 | | 49.4 | 10 | 0.5% octyl tin maleate | 2160 |
| 51 | 20 | | 34.8 | 34.8 | 10 | 0.5% octyl tin maleate | 1749 |
| 52 | 15.6 | 15.6 | 29.1 | 29.1 | 10 | 0.5% octyl tin maleate | 1971 |
| 53 | 10 | | 29.5 | 50 | 10 | 0.5% octyl tin maleate | 1669 |
| O | | 30 | 9.5 | 50 | 10 | 0.5% octyl tin maleate | |
| 54 | 15.6 | 15.6 | 29.1 | 29.1 | 10 | 0.5% octyl tin maleate | 1831 |
| 55 | 15.6 | 15.6 | 29.1 | 29.1 | 10 | 0.5% octyl tin maleate | 1895 |
| 56 | 30 | | 9.5 | 50 | 10 | 0.5% octyl tin maleate | 1469 |
| 57 | 30 | 30 | 29.5 | | 10 | 0.5% octyl tin maleate | 1952 |
| P | | 30 | 9.5 | 50 | 10 | 0.5% octyl tin maleate | |

[1]Lap shear after 1 week
[2]Polymer did not dissolve
[3]Composition gelled in 5 days at 150° F.
[4]Composition dries too slow
[5]Fumed silica separated out From the above, it can be seen that the addition of CDDK to solvent cements of various types does not adversely affect the bond strengths of the adhesive bonds produced by these compositions in any significant way.

In addition, it can also be seen that the total amount of volatile organic solvents in the inventive solvent cements is relatively low. In this regard, when tested according to Rule 1168 relating to adhesives and sealants of California's SCAQMD (South Coast Air Quality Management District), the improved solvent cements of the above Examples 24-26 exhibited VOC contents of 322, 259 and 537 gms/liter, respectively.

Although only a few embodiments have been shown above, it should be appreciated that many modifications can be made without departing from the spirit and scope of the technology described above. All such modifications are intended to be included with the scope of this technology, which is to be limited only by the following claims:

The invention claimed is:

1. A solvent cement comprising (a) a corresponding polymer selected from PVC, CPVC and ABS, (b) at least one liquid polar organic solvent, (c) an optional sulfur containing liquid solvent, (d) an optional liquid co-solvent capable of at least partially dissolving or at least swelling the corresponding polymer, (e) an optional additional polymer selected from an acrylic polymer, a vinyl aromatic polymer, a vinyl pyrrolidone polymer, and mixtures thereof, and (f) at least one oxygen and/or nitrogen-containing macrocyclic compound comprising a non-polymeric organic compound, including silicones, containing at least an eight member ring.

2. The solvent cement of claim 1, wherein the oxygen and/or nitrogen-containing macrocyclic compound is a ketone, crown ether, ester, silicone or amide.

3. The solvent cement of claim 2, wherein the oxygen and/or nitrogen-containing macrocyclic compound is at least one of a ketone selected from CDDK, cyclodecanone, cycloundecanone, cyclopentadecanone, norcamphor, cyclotridecanone and 2-adamantanone; a crown ether selected from 12-crown-4, 15-crown-5, 18-crown-6, dibenzo-18-crown-6, 4,10-diaza-15-crown-5, dicyclohexano-18-crown-6 and 21-crown-7; an ester selected from cyclopentadecanolide, oxacyclododecanone, oxacyclododecan-2-one and 16-hexadecanolide; a silicone selected from D4-methicone and D-5 methicone; and an amide selected from 2-azacyclodecanone and laurelactam.

4. The solvent cement of claim 3, wherein the oxygen and/or nitrogen-containing macrocyclic compound is CDDK.

5. The solvent cement of claim 1, wherein the polar organic solvent is one or more ketones, ethers, esters, amides, carbonates, or mixtures thereof.

6. The solvent cement of claim 5, wherein the solvent cement contains at least one sulfur containing liquid solvent selected from an organic sulfoxide, an organic sulfone, an organic sulfide, and mixture thereof.

7. The solvent cement of claim 1, wherein the solvent cement contains an additional polymer selected from an acrylic polymer, a vinyl aromatic polymer, a vinyl pyrrolidone polymer, and mixtures thereof.

8. The solvent cement of claim 7, wherein the additional polymer is an acrylic polymer.

9. The solvent cement of claim 1, wherein the solvent cement comprises 1-60wt. % oxygen and/or nitrogen-containing macrocyclic compound, 70-99% liquid polar organic solvent, 0-30 wt. % sulfur containing liquid organic solvent, 0-30 wt. % co-solvent, 3-60 wt. % corresponding resin and 0-10 wt. % additional polymer.

10. The solvent cement of claim 7, wherein the solvent cement comprises 5-25wt. % oxygen and/or nitrogen-containing macrocyclic compound, 45-90% polar organic solvent, 0-10 wt. % sulfur containing organic solvent, 0-10 wt. % co-solvent, 5-20 wt. % corresponding resin and 0-7 wt. % additional polymer.

11. The solvent cement of claim 10, wherein the solvent cement contains 5-20wt. % of at least one polyvinyl chloride polymer.

12. The solvent cement of claim 1, wherein the solvent cement contains 1-60wt. % CDDK, 0-30 wt. % DMSO, 0-50 wt. % MEK, 0-50 wt. % ACE, with the combined amounts of MEK and ACE being at least about 40 wt. %, 3-60 wt. % of a corresponding resin comprising a polyvinyl chloride polymer, a chlorinated polyvinyl chloride polymer, an acrylonitrile-butadiene-styrene polymer, or mixture thereof, and 0-10 wt. % of an additional polymer comprising an acrylic polymer, a vinyl aromatic polymer, a vinyl pyrrolidone polymer, or a mixture thereof.

13. The solvent cement of claim 12, wherein the solvent cement contains 5-25wt. % CDDK, 20-50 wt. % MEK, 20-40 wt. % ACE, and 5-20wt. % of corresponding resin.

14. A process for bonding PVC, CPVC and ABS plastic pipe and other molded articles to one another, the process comprising applying a solvent cement to the surfaces to be bonded and then bringing these surfaces into contact with one another, wherein the solvent cement comprises (a) a corresponding polymer selected from PVC, CPVC and ABS, (b) at least one liquid polar organic solvent, (c) an optional sulfur containing liquid solvent, (d) an optional liquid co-solvent capable of at least partially dissolving or at least swelling the corresponding polymer, (e) an optional additional polymer selected from an acrylic polymer, a vinyl aromatic polymer, a vinyl pyrrolidone polymer, and mixtures thereof, and (f) at least one oxygen and/or nitrogen-containing macrocyclic compound comprising a non-polymeric organic compound, including silicones, containing at least an eight member ring.

15. The process of claim 14, wherein the oxygen and/or nitrogen-containing macrocyclic compound is a ketone, crown ether, ester, silicone or amide.

16. The process of claim 15, wherein the oxygen and/or nitrogen-containing macrocyclic compound is at least one of a ketone selected from CDDK, cyclodecanone, cycloundecanone, cyclopentadecanone, norcamphor, cyclotridecanone and 2-adamantanone; a crown ether selected from 12-crown-4, 15-crown-5, 18-crown-6, dibenzo-18-crown-6, 4,10-diaza-15-crown-5, dicyclohexano-18-crown-6 and 21-crown-7; an ester selected from cyclopentadecanolide, oxacyclododecanone, oxacyclododecan-2-one and 16-hexadecanolide; a silicone selected from D4-methicone and D-5 methicone; and an amide selected from 2-azacyclodecanone and laurelactam.

17. The process of claim 16, wherein the oxygen and/or nitrogen-containing macrocyclic compound is CDDK.

* * * * *